April 3, 1962 C. L. BECK 3,028,599
AUTOMATIC DIRECTION FINDER INDICATOR
Filed Feb. 8, 1960

INVENTOR.
CHARLES L. BECK

ATTORNEYS

3,028,599
AUTOMATIC DIRECTION FINDER INDICATOR
Charles L. Beck, 258 Naples St., Chula Vista, Calif.
Filed Feb. 8, 1960, Ser. No. 7,465
2 Claims. (Cl. 343—113)

The present invention relates to an instrument for visually indicating the direction from where a radio signal is originated. More particularly, the present invention includes a direction compass, in combination with a selsyn having an indicator disposed above the compass card.

In carrying out the present invention, the selsyn is disposed at the bottom of the casing of the instrument; the compass card is carried by the upper end of the rotatable shaft of the selsyn and is rotatable independently of the shaft, so as to generally speaking, constantly maintain its position with respect to the magnetic poles of the earth; and an indicator is fixed to the shaft of the selsyn in visual registering relationship with the compass card.

The advantages of the present invention will be from the following description, reference being had to the accompanying drawings wherein a preferred embodiment of the invention is illustrated.

Figure 1:
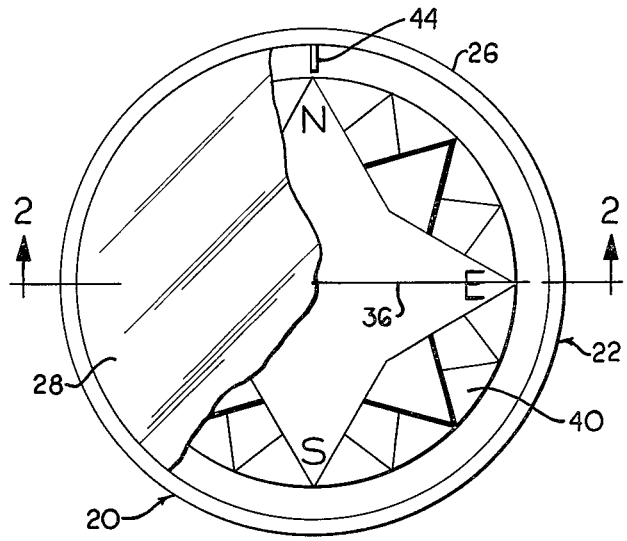
FIG. 1 is a top plan view of the improved instrument.
Figure 2:
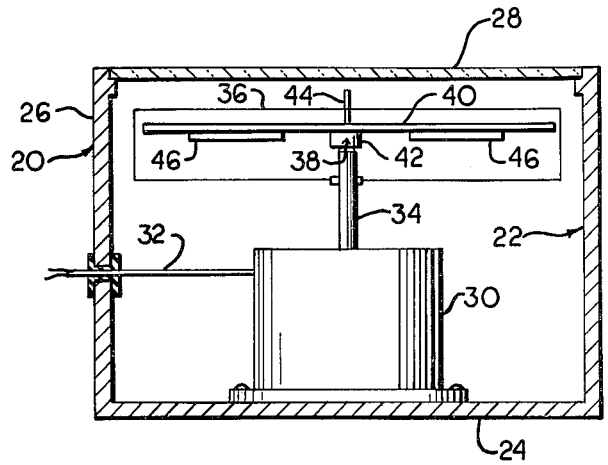
FIG. 2 is a view, partly in section, the section being taken along the line 2—2 of FIG. 1.

Referring more in detail to the drawing, the instrument 20 includes a box or casing 22, including a bottom wall 24, a cylindrical side wall 26, and a removable transparent top wall or cover 28. The casing 22 is formed of non-magnetic material such as brass or plastic.

An A.C. selsyn 30 is carried within the casing 20 by the bottom wall 24 and centrally thereof. This selsyn is attached to the bottom wall in any suitable manner. The conductors, connecting the selsyn with the proper co-operating instruments and source of current, are shielded in the insulating material 32. The selsyn includes an upwardly or vertically extending shaft 34, connected with the rotor (not shown) of the selsyn. An indicator 36 is fixed to the shaft in such position as to indicate the relative position of the shaft with respect to the "tuned in" station at which the radio signal originates. Such instruments are well known to those skilled in the art.

The upper end of the shaft 34 is provided with a bearing herein shown as a point cone or needle point 38. This bearing carries a dial or circular compass card 40 formed of non-magnetic material and having compass indicia thereon. To this end, the card is provided with an axially arranged jewel socket type bearing 42 which rests upon the needle point 38, whereby the compass card is freely rotatable relative to or with respect to the needle point of the shaft 34. The lubber line is herein shown as non-magnetic wire 44, carried by the side wall 26 of the casing. The underside of the card carries the permanent magnets 46.

If desirable, the card 40 may be formed of translucent or transparent material; in which event, the indicator 36 may be disposed directly below the card and the interior of the casing 22 would be illuminated so that the relative position thereof with respect to the card could be seen through the translucent or transparent card. However, in the preferred embodiment, the card is opaque and the visible part of the indicator is disposed above the card. In either aspect, the indicator would transverse the axes of the shaft and chart.

In the preferred aspect, as illustrated, the indicator 36 is in the form of a loop of fine non-magnetic wire, having the ends thereof suitably fixed to the shaft so as to rotate or oscillate therewith. The upper run of the wire traverses the axes of the card 40 and shaft 34. The upper half or a portion of one end of the upper run of the wire is colored different than the other half or a portion of the other end of the wire so that the observer will not be mislead by 180 degrees, as could occur if both sides of the wire appeared visually the same.

By virtue of the present invention, the indicator and card are readily visible through the transparent cover. By so positioning the card and indicator, the shaft 34 can be lengthened to such degree that the magnets 46 on the card are not influenced by the current flow in the selsyn, while still maintaining compactness of the instrument in its entirety.

While the form of embodiment herein shown and described constitutes a preferred form, it is to be understood that other forms may be adopted falling within the scope of the claims that follow.

I claim:

1. An instrument for visually indicating the direction from where a radio signal is originated, comprising in combination, a casing having a transparent cover; a selsyn carried by and within the lower part of the casing, said selsyn including a rotatable shaft extending upwardly; a compass card carried by the upper end of the shaft and rotatably movable independently of the shaft; and a wire loop of non-magnetic material fixed to the shaft and rotatable therewith and encircling the card, the upper run of said wire transversing the axis of the shaft, one end of the upper run of the wire having a different color than the other end of said run.

2. An instrument for visually indicating the direction from where a radio signal is originated, comprising in combination, a casing having a transparent cover; a selsyn carried by and within the lower part of the casing, said selsyn including a rotatable shaft extending upwardly; a compass card carried by the upper end of the shaft and rotatably movable independently of the shaft; and a wire loop of non-magnetic material fixed to the shaft and rotatable therewith and encircling the card, the upper run of said wire transversing the axis of the shaft.

References Cited in the file of this patent

UNITED STATES PATENTS 1,692,051     Patterson _____ Nov. 20, 1928

FOREIGN PATENTS 727,939     Germany _____ Nov. 16, 1942

OTHER REFERENCES

Standard Handbook for Electrical Engineers, McGraw-Hill Book Co., Inc., 1949, New York, pages 7–180 relied on.